(12) United States Patent
Lakshmanan

(10) Patent No.: US 10,664,828 B2
(45) Date of Patent: May 26, 2020

(54) PREPAID DEBIT CARD TRANSACTION PROCESSING

(71) Applicant: Raman Lakshmanan, Long Branch, NJ (US)

(72) Inventor: Raman Lakshmanan, Long Branch, NJ (US)

( * ) Notice: Subject to any disclaimer, the term of this patent is extended or adjusted under 35 U.S.C. 154(b) by 78 days.

(21) Appl. No.: 16/178,091

(22) Filed: Nov. 1, 2018

(65) Prior Publication Data

US 2019/0130388 A1    May 2, 2019

Related U.S. Application Data

(60) Provisional application No. 62/580,235, filed on Nov. 1, 2017.

(51) Int. Cl.
*G06Q 20/34* (2012.01)
*G06Q 20/20* (2012.01)
*G06Q 20/40* (2012.01)
*G06Q 20/26* (2012.01)
*G06F 16/24* (2019.01)

(52) U.S. Cl.
CPC ......... *G06Q 20/342* (2013.01); *G06Q 20/202* (2013.01); *G06Q 20/204* (2013.01); *G06Q 20/26* (2013.01); *G06Q 20/409* (2013.01); *G06F 16/24* (2019.01)

(58) Field of Classification Search
None
See application file for complete search history.

(56) References Cited

U.S. PATENT DOCUMENTS

2011/0057031 A1 *  3/2011  Persaud ................. G06Q 20/20
                                                         235/380

* cited by examiner

*Primary Examiner* — Paul Danneman
(74) *Attorney, Agent, or Firm* — Patterson + Sheridan, LLP

(57) ABSTRACT

An example method of processing a transaction associated with a prepaid debit card includes: triggering, by an agent executing on a point-of-sale (POS) device, an alternative handling procedure for the transaction; sending, as part of the alternative handling procedure, the transaction from the POS device to a server; verifying the transaction at the server; sending, in response to the transaction satisfying the step of verifying: a request from the server to an issuing bank system to fund an account associated with the prepaid debit card; and an authorization from the server to the POS device; and triggering, by the agent executing on the POS device in response to the authorization, a nominal handling procedure for the transaction.

20 Claims, 4 Drawing Sheets

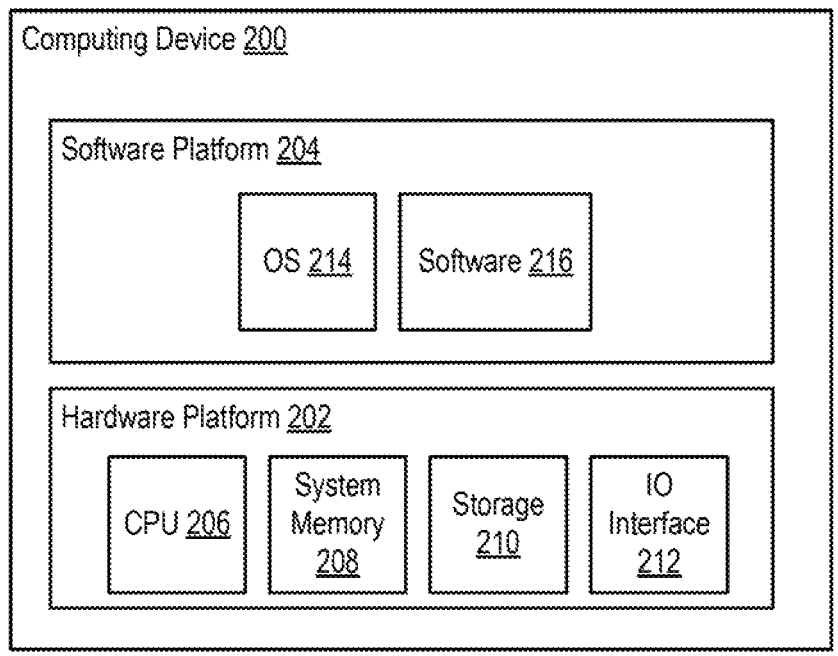
FIG. 2
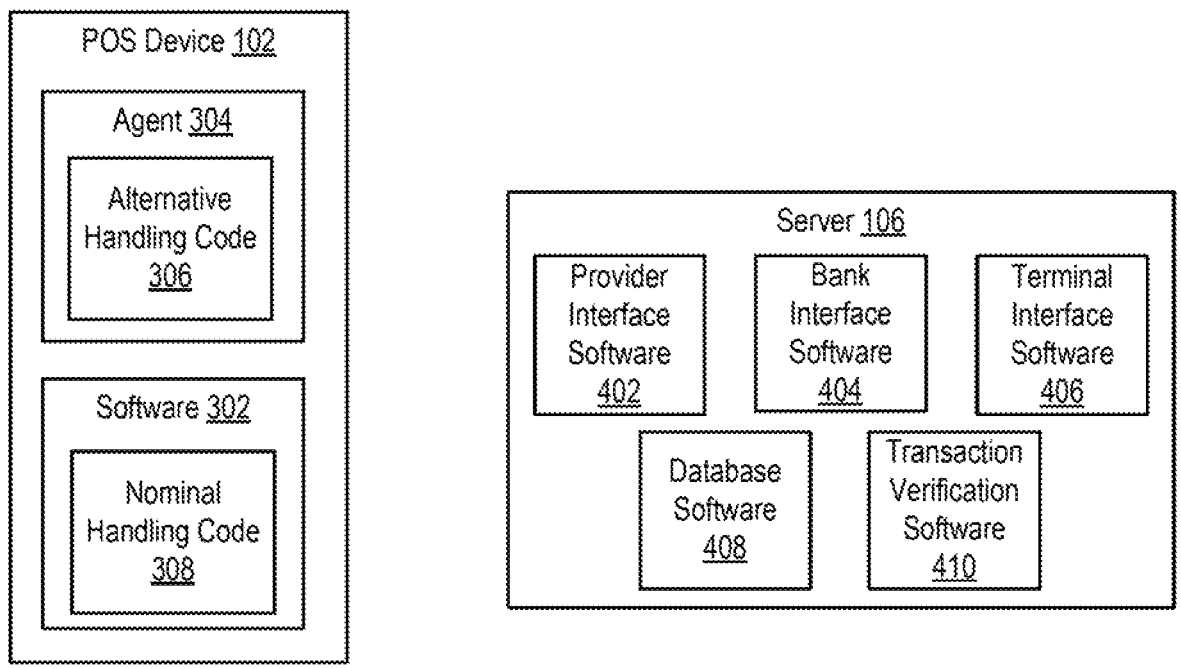
FIG. 3
FIG. 4

PREPAID DEBIT CARD TRANSACTION PROCESSING

CROSS-REFERENCE TO RELATED APPLICATIONS

This application claims benefit of U.S. provisional patent application Ser. No. 62/580,235, filed Nov. 1, 2017, entitled "PREPAID DEBIT CARD TRANSACTION PROCESSING," which is herein incorporated by reference.

BACKGROUND

A debit card is a plastic payment card, similar to a credit card, which can be used to purchase goods and services from purveyors of such goods and services (generally referred to as "merchants"). Typically, a debit card is backed by an account at an issuing bank that belongs to the user of the debit card. For a debit card transaction, funds are drawn directly from the account that backs the debit card. If the funds are not present in the account at the time of the transaction, then the issuing bank rejects the transaction. The rejection is returned to the merchant, who declines the transaction with the user.

A "prepaid debit card" is a type of debit card that is backed by an account at an issuing bank. Typically, however, the account that backs a prepaid debit card does not belong to the user of the prepaid debit card. The provider of the prepaid debit card (e.g., a merchant, bank, or the like) creates and funds the account with a specified amount of money, associates the account with the prepaid debit card, and then provides the prepaid debit card to the user. For a prepaid debit card transaction, funds are drawn directly from the account that backs the prepaid debit card.

As with a debit card, if the funds are not present in the account backing a prepaid debit card at the time of the transaction, then the issuing bank rejects the transaction. Since a provider of a prepaid debit card does not know when a user will perform a transaction, the provider must fund the account that backs the prepaid debit card at or near the time of providing the prepaid debit card to the user. This results in inefficient use of the provider's capital. Further, at the time of a transaction, the issuing bank only determines whether there are sufficient funds available in the account. No other verification is performed with respect to the transaction.

SUMMARY

Techniques for prepaid debit card transaction processing are described. In an embodiment, a method of processing a transaction associated with a prepaid debit card includes: triggering, by an agent executing on a point-of-sale (POS) device, an alternative handling procedure for the transaction; sending, as part of the alternative handling procedure, the transaction from the POS device to a server; verifying the transaction at the server; sending, in response to the transaction satisfying the step of verifying: a request from the server to an issuing bank system to fund an account associated with the prepaid debit card; and an authorization from the server to the POS device; and triggering, by the agent executing on the POS device in response to the authorization, a nominal handling procedure for the transaction.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a block diagram depicting a computing device that can be used in embodiments described herein.

FIG. 3 is a block diagram depicting a point-of-sale (POS) device according to an embodiment.

FIG. 4 is a block diagram of a server according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for prepaid debit card transaction processing are described. The techniques allow a provider to issue a prepaid debit card to a user without immediately funding an account that backs the prepaid debit card. Rather, the techniques will fund an account backing the prepaid debit card at the time of the transaction. Further, the techniques allow a provider to issue a prepaid debit card with conditions, which the transaction must satisfy, that go above and beyond verifying there are sufficient funds to cover the transaction.

In an example use case, a provider may issue a prepaid debit card to a user for the purpose of paying for a user's health insurance co-payments. The provider associates various conditions with use of the prepaid debit card. For example, the provider can dictate that the prepaid debit card can only be used for the purpose of purchasing particular medical services or particular pharmaceutical products. The transaction processing techniques described herein enable verification of the provider's conditions at the time of a transaction, while also enabling just-in-time funding of the account backing the prepaid debit card.

In an embodiment, a technique for processing a transaction associated with a prepaid debit card includes intelligence in a point-of-sale (POS) device that triggers an alternative handling procedure for a transaction associated with a specific prepaid debit card. The POS device sends, as part of the alternative handling procedure, the transaction to a server of an alternative handling system. The server includes intelligence to verify the transaction, send a request to an issuing bank system to fund an account associated with the prepaid debit card, and to return an authorization to the POS device. The intelligence in the POS device then triggers a nominal handling procedure for the transaction. The nominal handling procedure can include sending the transaction to a processor system designated by an acquiring bank of the merchant. The transaction will eventually be submitted to the issuing bank, which will verify the account has sufficient funds and approve the transaction. These and further aspects of the techniques are described below with respect to the drawings.

Figure 1:
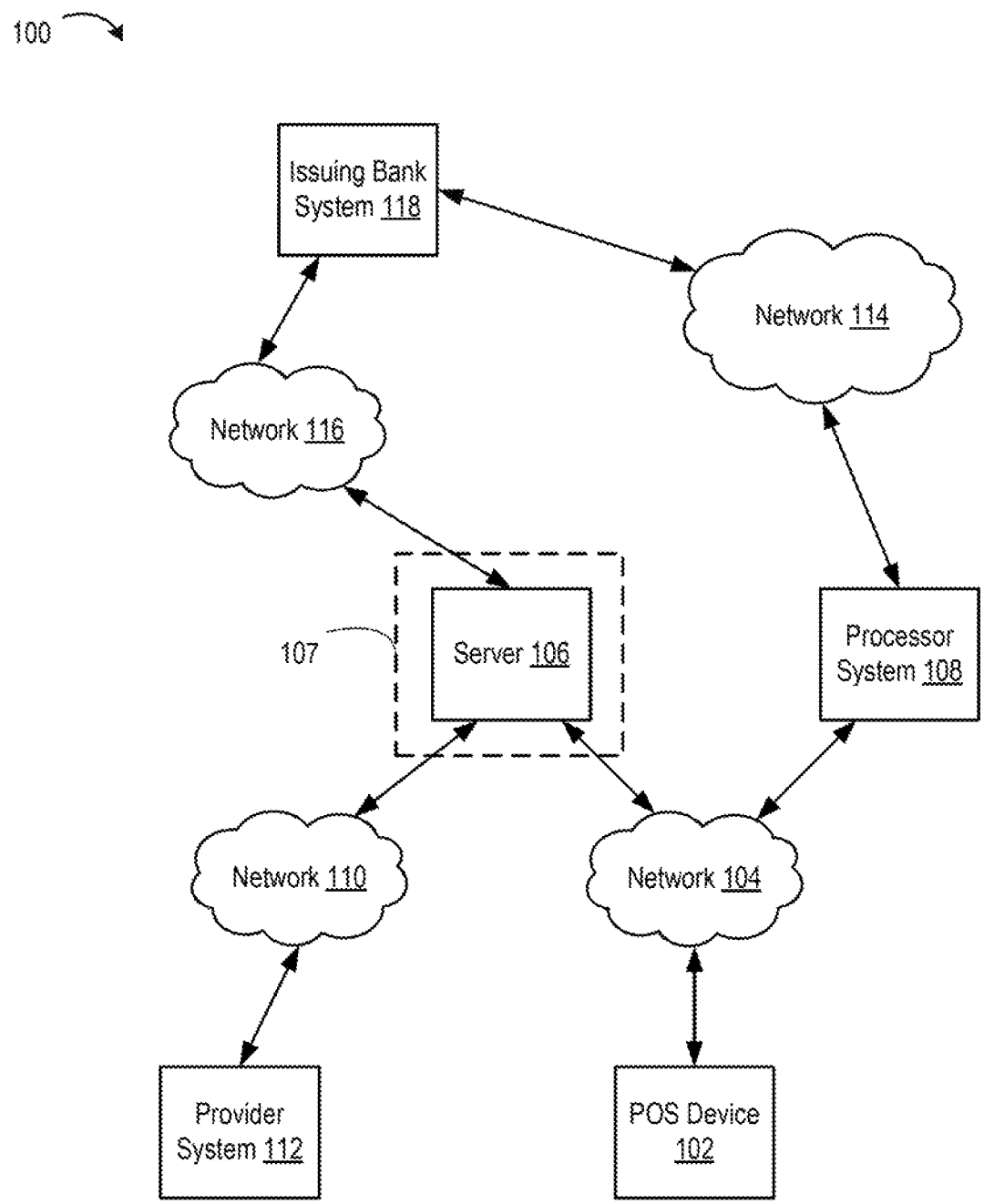
FIG. 1 is a block diagram depicting a system for processing a transaction associated with a prepaid debit card according to an embodiment.

FIG. 1 is a block diagram depicting a system 100 for processing a transaction associated with a prepaid debit card according to an embodiment. The system 100 includes a point-of-sale (POS) device 102, a server 106, a processor system 108, an issuing bank system 110, and a provider system 112. The POS device 102 can communicate with the server 106 and the processor system 108 through a network 104. The processor system 108 can communicate with the issuing bank system 118 through a network 114. The server 106 can communicate with the issuing bank 118 through a network 116. The provider system 112 can communicate with the server 106 through a network 106. The networks 104, 110, 116, and 114 can include private networks, public networks, or combinations thereof, including packet-switched networks (e.g., local area networks (LANs), wide area networks (WANs), the public Internet, etc.), circuit-switched networks (e.g., a public switched telephone network (PTSN), integrated services digital network (ISDN), etc.), or combinations thereof.

The POS device 102 can be any type of computing device that can scan or otherwise process credit cards, debit cards, prepaid debit cards, and the like. The server 106 can include any type of computing system configured to execute software and perform the functions described herein. The processor system 108, the issuing bank system 118, and the provider system 112 can include one or more servers, computing systems, internal networks, and the like configured to perform the functions described herein.

The server 106 can be part of an alternative processor system 107. A provider of prepaid debit cards can operate the provider system 112. A card processor can operate the alternative processor system 107. The provider can use the card processor to process transactions corresponding to prepaid debit cards issued by the provider to users. The provider system 112 communicates with the server 106 to supply constraint information for the various users having prepaid debit cards issued by the provider. The server 106 maintains the constraint information to use during transaction verification, as described further herein.

A merchant operates the POS device 102. The merchant uses the POS device 102 to scan or otherwise process prepaid debit cards of users that are issued by the provider (as well as any other credit/debit card issued by other providers). The POS device 102 identifies any transaction associated with a prepaid debit card issued by the provider and performs an alternative handling procedure, described further herein. For any other credit/debit card, the POS device 102 performs a nominal handling procedure. In the nominal handling procedure, the POS device 102 sends the transaction to the processor system 108 through the network 104. The processor system 108 can be operated by a nominal card processor used by an acquiring bank of the merchant. The processor system 108 forwards the transaction to the issuing bank 118 (or some other issuing bank) through the network 114.

In the alternative handling procedure, the POS device 102 sends the transaction to the server 106, rather than the processor system 108. The server 106 performs verification of the transaction. In general, the server 108 obtains constraint information for a user of the prepaid debit card based on information in the transaction. The server 108 compares data from the transaction with data of the constraint information to determine if the transaction is authorized. If the transaction is not authorized, the server 108 returns a response to the POS device 102 through the network 104 indicating that the transaction is not authorized. If the transaction is authorized, the server 106 sends a request to the issuing bank system 118 through the network to fund an account associated with the prepaid debit card. The server 106 then sends a response to the POS device 102 indicating the transaction is authorized. The POS device 102 then triggers the nominal handling procedure for the transaction. Since the account associated with the prepaid debit card has been funded upon request from the server 106, the issuing bank system 118 will authorize the transaction during the nominal handling procedure.

FIG. 2 is a block diagram depicting a computing device 200 that can be used in embodiments described herein. The computing device 200 can be used to implement the POS device 102 and/or the server 106. The computing device 200 includes a software platform 204 executing on a hardware platform 202. The hardware platform 202 may include conventional components of a computing device, such as a central processing unit (CPU) 206 and system memory 208, as well as a storage system ("storage 210"), input/output (IO) devices ("IO interface 212"), and the like. The CPU 206 is configured to execute instructions, for example, executable instructions that perform one or more operations described herein and may be stored in the system memory 208 and the storage 210. The system memory 208 is a device allowing information, such as executable instructions and other data, to be stored and retrieved. The system memory 208 may include, for example, one or more random access memory (RAM) modules. The IO interface 212 can include various input devices for processing credit cards, debit cards, and the like. For example, the IO interface 212 can include a scanner for scanning a magnetic strip of a card, a keypad or keyboard for entering a bank identification number (BIN) of a card, or the like.

The software platform 204 includes an operating system (OS) 214 and software 216. The OS 214 can be any commodity operating system known in the art, such as Linux®, Microsoft Windows®, Mac OS®, or the like, or any special-purpose OS designed for a particular device (e.g., a special-purpose OS for operating a POS device). The software 216 executes on the hardware platform 202 and interfaces the hardware platform through the OS 214. The software 216 includes code or instructions, which can be stored in the system memory 208 and/or the storage 210, and which are executable by the CPU 206 to perform the various functions of the POS device 102 and/or the server 106 described herein.

FIG. 3 is a block diagram depicting the POS device 102 according to an embodiment. The POS device 102 can be implemented using a computing device, such as the computing device 200 described in FIG. 2. The POS device 102 includes software 302 and an agent 304. The software 302 includes code for initiating a nominal handling procedure ("nominal handling code 308"). The agent 304 includes code for initiating an alternative handling procedure ("alternative handling code 306"). The software 302 is configured to obtain transaction information for each transaction (e.g., through scanning of a card, keypad input, etc.). The transaction information includes a BIN number of the card, an amount to be charged/debited, and any other auxiliary information related to the goods/services of the transaction. The agent 304 is configured to monitor the transaction information for each transaction. The agent 304 is configured to identify particular prepaid debit cards issued by the provider. The agent 304 can identify the particular prepaid debit cards using the BIN number. If the transaction is not associated with a designated prepaid debit card, the agent 304 allows the software 302 to execute the nominal handling code 308 to begin the nominal handling procedure. If the transaction is associated with a designated prepaid debit card, the agent 304 executes the alternative handling code 306 (rather than instructing the software 302 to execute the nominal handling code 308). The alternative handling code 306 begins the alternative handling procedure discussed above. The agent 304 is further configured to receive responses from the server 106. In response to an authorization received from the server 106, the agent 304 is configured to control the software 302 to execute the nominal handling code 308. In response to a response that the transaction is not authorized, the agent 304 causes the software 302 to indicate such.

FIG. 4 is a block diagram of the server 106 according to an embodiment. The server 106 can be implemented using a computing device, such as the computing device 200 described in FIG. 2. The server 106 includes various software, including provider interface software 402, bank interface software 404, terminal interface software 406, database software 408, and transaction verification software 410. Note that while the server 106 is shown as having various software modules performing specific functions, it is to be understood that the server 106 can include one or more software modules that perform the various functions of the software modules 404 . . . 410.

The terminal interface software 406 is configured to receive transaction requests from the POS device 102, and provide transaction responses to the POS device 102. The terminal interface software 406 communicates a requested transaction to the transaction verification software 410. The transaction verification software 410 processes the transaction to obtain transaction data. The transaction data includes at least an identifier of a prepaid debit card (e.g., a BIN number) and a transaction amount to be debited. The transaction data can also include auxiliary information related to the product or service of the transaction.

For example, the transaction information can include Level 3 Card Processing information obtained by the POS device 102 for the transaction. Notably, as is known in the art, Level 1 Card Processing information includes the least amount of auxiliary information, such as a date. Level 2 Card Processing information includes more than Level 1 Card Processing information, such as a date, a tax amount, a customer code, a merchant postal code, a tax identification number, and the like. Level 3 Card Processing information includes more than Level 3 Card Processing information, such as ship from/to postal codes, an invoice number, an order number, an item product code, an item description, an item unit of measure, and the like. Thus, the Level 3 Processing information includes descriptive information related to the goods or services of the transaction.

The transaction verification software 410 obtains a user identifier from the transaction data (e.g., from the BIN number). The transaction verification software 410 queries the database software 408 using the user identifier as parametric input to obtain constraint data for the user. The constraint data can specify various restrictions on the goods and/or services for which the prepaid debit card can be used. The transaction verification software 410 compares the auxiliary information of the transaction data that describes the product or service with the constraint data obtained from the database software 408. The transaction verification software 410 generates a result that indicates whether the transaction is authorized or not authorized based on the comparison operation. If the transaction is not authorized, the transaction verification software 410 communicates the result to the terminal interface software 406, which in turn communicates the result to the POS device 102.

If the transaction is authorized, the transaction verification software 410 notifies the bank interface software 404 of an approved transaction. The bank interface software 404 sends a request to the issuing bank system 118 to fund an account backing the prepaid debit card. The bank interface software 404 can obtain information for identifying the issuing bank from the BIN number. The bank interface software 404 can provide the BIN number to the issuing bank system 118 to fund the account. The bank interface software 404 requests funding equal to at least the transaction amount (can be more than the transaction amount). The bank interface software 404 notifies the transaction verification software 410 after the funding operation is complete. The transaction verification software 410 then communicates the result (e.g., approval) to the terminal interface software 406, which in turn communicates the result to the POS device 102.

The provider interface software 402 is configured to communicate with the provider system 112 to obtain user and associated constraint information. The provider interface software 402 sends the information to the database software 408 for storage. The database software 408 can include any type of relational database software known in the art. The database software 408 stores records that relate users to constraint data as received from the provider system 112.

In an embodiment, the transaction verification software 410 updates the record for the user in the database 408 for each transaction for that user. For example, the transaction verification software 410 can update an accumulated amount of money spent by the user over time, an accumulated amount of product or service received over time, or the like. The constraint data for the user can include constraints on a total amount of money spent, a total amount of product or service consumed, or the like. The verification software 410 can use these additional constraints in combination with the initial constraints received from the provider system 112 during the verification process.

Figure 5:
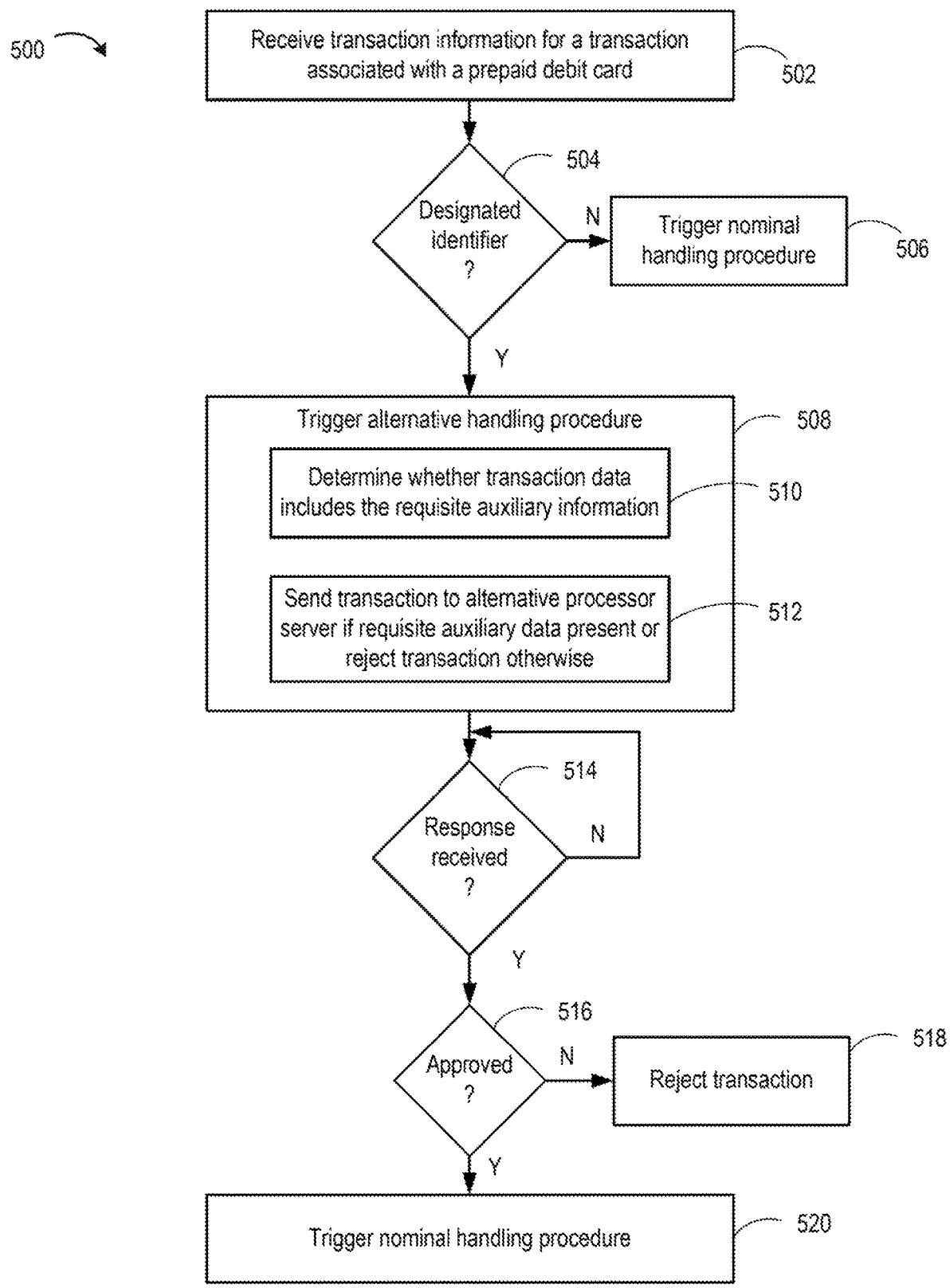
FIG. 5 is a flow diagram depicting a method of handling a transaction associated with a prepaid debit card at a POS device according to an embodiment.

FIG. 5 is a flow diagram depicting a method of handling a transaction associated with a prepaid debit card at a POS device according to an embodiment. The method 500 begins at step 502, where the POS device 102 receives transaction information for the transaction. At step 504, the POS device 102 determines whether the transaction includes a designated identifier for a particular prepaid debit card issued by the provider. If not, the method 500 proceeds to step 506, where the POS device 102 triggers the nominal handling procedure for the transaction. Otherwise, the method 500 proceeds to step 508.

At step 508, the POS device 102 triggers the alternative handling procedure for the transaction. In an embodiment, at step 510, the POS device 102 determines whether the transaction data includes the requisite auxiliary information (e.g., Level 3 Card Processing information). At step 512, the POS device 102 sends the transaction to the server 106 if the transaction data includes the requisite auxiliary information. Otherwise, the POS device 102 rejects the transaction. In another embodiment, the POS device 102 can omit the check of the auxiliary data and can just send the transaction to the server 106 for verification.

The method 500 continues to step 514, where the POS device 102 waits for a response from the server 106. Upon receiving a response, the method 500 proceeds to step 516. At step 516, the POS device 102 determines whether the transaction is approved based on the response from the server 106. If the response is approved, the method 500 proceeds to step 520, where the POS device 102 triggers the nominal handling procedure. Otherwise, if the transaction is not approved, the method 500 proceeds to step 518, where the POS device 102 rejects the transaction.

Figure 6:
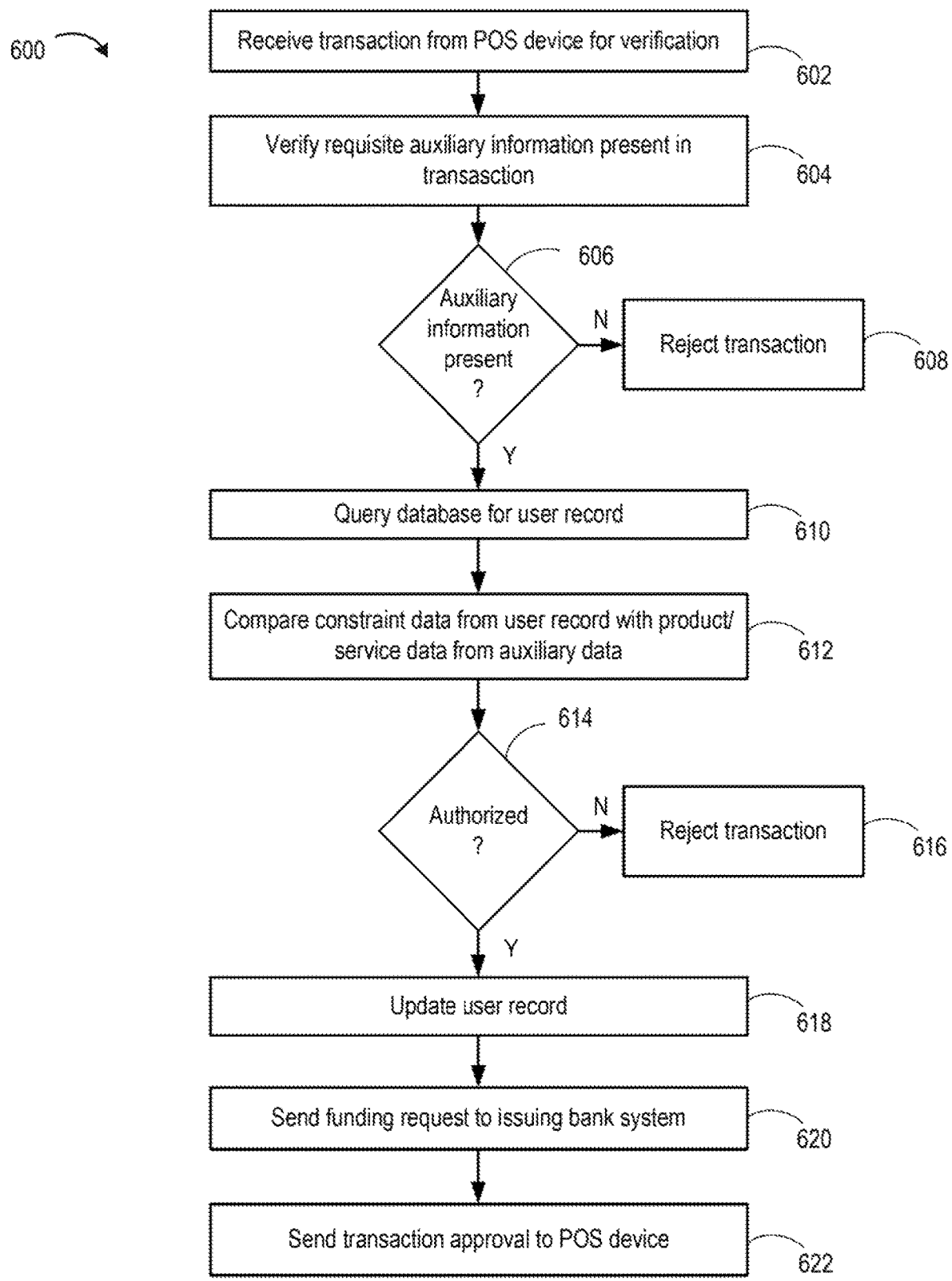
FIG. 6 is a flow diagram depicting a method of verifying a transaction associated with a prepaid debit card according to an embodiment.

FIG. 6 is a flow diagram depicting a method 600 of verifying a transaction associated with a prepaid debit card according to an embodiment. The method 600 begins at step 602, where the server 106 receives a transaction from the POS device 102 for verification. At step 604, the server 106 verifies that the transaction includes the requisite auxiliary information needed for verification. Alternatively, the check for the requisite auxiliary information can be performed by the POS device 102. In yet another alternative, both the server 106 and the POS device 102 can perform the check for the requisite auxiliary information (e.g., Level 3 Card Processing information).

At step 606, the server 106 determines if the auxiliary information is present. If not, the server 106 rejects the transaction at step 608. Otherwise, the method 600 proceeds to step 610. At step 610, the server 106 queries a database for a user record. The server 106 can obtain a user identifier from the transaction data. The user record can include various constraint data associated with a user.

At step 612, the server 106 compares the constraint data from the user record with product/service data from the auxiliary information of the transaction data. At step 614, the server 106 determines if the transaction is authorized. If the product/service data violates any of constraint specified in the constraint data, the server 106 can reject the transaction. Otherwise, the server 106 can approve the transaction. If the transaction is not authorized, the method 600 proceeds to step 616, where the server 106 rejects the transaction. Otherwise, the method 600 proceeds to step 618.

At step 618, the server 106 can update the user record with information from the transaction. For example, the server 106 can update an accumulate amount spent, an accumulated product/service consumed, or the like. At step 620, the server 106 sends a funding request to the issuing bank system 118. The server 106 can request funding in an amount at least equal to the transaction amount. At step 622, the server 106 sends the transaction approval to the POS device 102.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A method of processing a transaction associated with a prepaid debit card, comprising:
    triggering, by an agent executing on a point-of-sale (POS) device, an alternative handling procedure for the transaction;
    sending, as part of the alternative handling procedure, the transaction from the POS device to a server;
    verifying the transaction at the server;
    sending, in response to the transaction satisfying the step of verifying: a request from the server to an issuing bank system to fund an account associated with the prepaid debit card; and an authorization from the server to the POS device; and
    triggering, by the agent executing on the POS device in response to the authorization, a nominal handling procedure for the transaction.

2. The method of claim 1, wherein the server is a first server of an alternative payment processor system, and wherein the method further comprising:
    sending, as part of the nominal handling procedure, the transaction from the POS device to a second server of a nominal payment processor system.

3. The method of claim 1, wherein the step of triggering the alternative handling procedure comprises:
    detecting a designated identifier in a bank identification number (BIN) of the prepaid debit card;
    executing the alternative handling procedure in response to detection of the designated identifier.

4. The method of claim 1, wherein the step of triggering the alternative handling procedure comprises:
    detecting a designated identifier in a bank identification number (BIN) of the prepaid debit card;
    determining that data of the transaction satisfies a threshold amount of data; and
    executing the alternative handling procedure in response to detection of the designated identifier and to the determination that the data of the transaction satisfies the threshold.

5. The method of claim 1, wherein the step of verifying comprises:
    obtaining data from the transaction;
    querying a database using at least a portion of the data as parametric input to obtain a record for a user of the prepaid debit card;
    comparing the data against the record to perform the verification.

6. The method of claim 5, wherein the step of verifying comprises:
    determining that data of the transaction satisfies a threshold amount of data; and
    performing the step of querying the database in response to the determination that the data of the transaction satisfies the threshold.

7. The method of claim 5, wherein the data includes information describing a product or service, and wherein the record includes information describing at least one authorized product or service for the user.

8. A system processing a transaction associated with a prepaid debit card, comprising:
    a server; and
    a point-of-sale (POS) device having an agent executing thereon configured to trigger an alternative handling procedure for the transaction, send, as part of the alternative handling procedure, the transaction to the server, and trigger, in response to an authorization, a nominal handling procedure for the transaction;
    wherein the server is configured to verify the transaction and send, in response to the verification of the transaction: a request to an issuing bank system to fund an account associated with the prepaid debit card; and an authorization to the POS device.

9. The system of claim 8, wherein the server is a first server of an alternative payment processor system, and wherein the POS device is further configured to:
    send, as part of the nominal handling procedure, the transaction to a second server of a nominal payment processor system.

10. The system of claim 8, wherein the POS device is configured to trigger the alternative handling procedure by:
  detecting a designated identifier in a bank identification number (BIN) of the prepaid debit card;
  executing the alternative handling procedure in response to detection of the designated identifier.

11. The system of claim 8, wherein the POS device is configured to trigger the alternative handling procedure by:
  detecting a designated identifier in a bank identification number (BIN) of the prepaid debit card;
  determining that data of the transaction satisfies a threshold amount of data; and
  executing the alternative handling procedure in response to detection of the designated identifier and to the determination that the data of the transaction satisfies the threshold.

12. The system of claim 8, wherein the server is configured to verify the transaction by:
  obtaining data from the transaction;
  querying a database using at least a portion of the data as parametric input to obtain a record for a user of the prepaid debit card;
  comparing the data against the record to perform the verification.

13. The system of claim 12, wherein the server is further configured to verify the transaction by:
  determining that data of the transaction satisfies a threshold amount of data; and
  performing the step of querying the database in response to the determination that the data of the transaction satisfies the threshold.

14. The system of claim 12, wherein the data includes information describing a product or service, and wherein the record includes information describing at least one authorized product or service for the user.

15. A non-transitory computer readable medium having instructions stored thereon that when executed by a processor cause the processor to perform a method of processing a transaction associated with a prepaid debit card, comprising:
  triggering, by an agent executing on a point-of-sale (POS) device, an alternative handling procedure for the transaction;
  sending, as part of the alternative handling procedure, the transaction from the POS device to a server;
  verifying the transaction at the server;
  sending, in response to the transaction satisfying the step of verifying: a request from the server to an issuing bank system to fund an account associated with the prepaid debit card; and an authorization from the server to the POS device; and
  triggering, by the agent executing on the POS device in response to the authorization, a nominal handling procedure for the transaction.

16. The non-transitory computer readable medium of claim 15, wherein the server is a first server of an alternative payment processor system, and wherein the method further comprising:
  sending, as part of the nominal handling procedure, the transaction from the POS device to a second server of a nominal payment processor system.

17. The non-transitory computer readable medium of claim 15, wherein the step of triggering the alternative handling procedure comprises:
  detecting a designated identifier in a bank identification number (BIN) of the prepaid debit card;
  executing the alternative handling procedure in response to detection of the designated identifier.

18. The non-transitory computer readable medium of claim 15, wherein the step of triggering the alternative handling procedure comprises:
  detecting a designated identifier in a bank identification number (BIN) of the prepaid debit card;
  determining that data of the transaction satisfies a threshold amount of data; and
  executing the alternative handling procedure in response to detection of the designated identifier and to the determination that the data of the transaction satisfies the threshold.

19. The non-transitory computer readable medium of claim 15, wherein the step of verifying comprises:
  obtaining data from the transaction;
  querying a database using at least a portion of the data as parametric input to obtain a record for a user of the prepaid debit card;
  comparing the data against the record to perform the verification.

20. The non-transitory computer readable medium of claim 15, wherein the data includes information describing a product or service, and wherein the record includes information describing at least one authorized product or service for the user.

* * * * *